US008413229B2

(12) United States Patent
Mullick et al.

(10) Patent No.: US 8,413,229 B2
(45) Date of Patent: Apr. 2, 2013

(54) METHOD AND APPLIANCE FOR AUTHENTICATING, BY AN APPLIANCE, A CLIENT TO ACCESS A VIRTUAL PRIVATE NETWORK CONNECTION, BASED ON AN ATTRIBUTE OF A CLIENT-SIDE CERTIFICATE

(75) Inventors: Amarnath Mullick, Bangalore (IN); Shashi Nanjundaswamy, Bangalore (IN); Ajay Soni, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 861 days.

(21) Appl. No.: 11/465,894

(22) Filed: Aug. 21, 2006

(65) Prior Publication Data
US 2008/0072311 A1 Mar. 20, 2008

(51) Int. Cl.
*H04L 29/00* (2006.01)
(52) U.S. Cl. ........... 726/15; 713/183; 713/184; 713/185
(58) Field of Classification Search ............... 726/2–21; 713/168–181, 183–185
See application file for complete search history.

(56) References Cited

U.S. PATENT DOCUMENTS

| 5,867,494 | A | 2/1999 | Krishnaswamy et al. |
|---|---|---|---|
| 5,999,525 | A | 12/1999 | Krishnaswamy et al. |
| 6,308,273 | B1 | 10/2001 | Goertzel et al. |
| 6,335,927 | B1 | 1/2002 | Elliott et al. |
| 6,502,102 | B1 | 12/2002 | Haswell et al. |
| 6,523,027 | B1 | 2/2003 | Underwood |
| 6,601,233 | B1 | 7/2003 | Underwood |
| 6,609,128 | B1 | 8/2003 | Underwood |
| 6,633,878 | B1 | 10/2003 | Underwood |
| 6,701,514 | B1 | 3/2004 | Haswell et al. |
| 6,704,873 | B1 | 3/2004 | Underwood |
| 6,718,535 | B1 | 4/2004 | Underwood |
| 6,731,625 | B1 | 5/2004 | Eastep et al. |
| 6,754,181 | B1 | 6/2004 | Elliott et al. |
| 6,907,546 | B1 | 6/2005 | Haswell et al. |
| 6,909,708 | B1 | 6/2005 | Krishnaswamy et al. |
| 7,058,180 | B2 * | 6/2006 | Ferchichi et al. ............. 380/247 |
| 7,100,195 | B1 | 8/2006 | Underwood |
| 7,103,772 | B2 | 9/2006 | Jorgensen et al. |
| 7,107,285 | B2 | 9/2006 | von Kaenel et al. |
| 7,145,898 | B1 | 12/2006 | Elliott |

(Continued)

FOREIGN PATENT DOCUMENTS
WO WO-2007/024647 A2 3/2007

OTHER PUBLICATIONS

U.S. Office Action, dated Aug. 3, 2009, in U.S. Appl. No. 11/465,915, 12 pages.

(Continued)

*Primary Examiner* — Philip Chea
*Assistant Examiner* — Ghazal Shehni
(74) *Attorney, Agent, or Firm* — Foley and Lardner LLP; Christopher J. McKenna

(57) ABSTRACT

In a method and appliance for authenticating, by an appliance, a client to access a virtual network connection, based on an attribute of a client-side certificate, a client authentication certificate is requested from a client. A value of at least one field in the client authentication certificate received from the client is identified. One of a plurality of types of access is assigned responsive to an application of a policy to the identified value of the at least one field, each of the plurality of access types associated with at least one connection characteristic.

55 Claims, 9 Drawing Sheets

U.S. PATENT DOCUMENTS

| | | | |
|---|---|---|---|
| 7,437,457 B1* | 10/2008 | Eisendrath et al. | 709/225 |
| 7,634,800 B2 | 12/2009 | Ide et al. | |
| 2003/0014628 A1* | 1/2003 | Freed et al. | 713/155 |
| 2003/0041091 A1 | 2/2003 | Cheline et al. | |
| 2004/0255048 A1 | 12/2004 | Lev Ran et al. | |
| 2005/0015594 A1* | 1/2005 | Ashley et al. | 713/168 |
| 2005/0132030 A1 | 6/2005 | Hopen et al. | |
| 2005/0132060 A1* | 6/2005 | Mo et al. | 709/227 |
| 2005/0210263 A1* | 9/2005 | Levas et al. | 713/182 |
| 2006/0075464 A1 | 4/2006 | Golan et al. | |
| 2006/0085850 A1* | 4/2006 | Mayfield et al. | 726/14 |
| 2007/0253553 A1* | 11/2007 | Abdul Rahman | 380/259 |

OTHER PUBLICATIONS

Office Action for U.S. Appl. No. 11/465,915 dated Dec. 31, 2009.
Advisory Action for U.S. Appl. No. 11/465,915 dated Mar. 10, 2010.
Office Action for U.S. Appl. No. 11/465,915 dated Jun. 29, 2010.
Office Action on U.S. Appl. No. 11/465,915 dated Dec. 3, 2010.

* cited by examiner

METHOD AND APPLIANCE FOR AUTHENTICATING, BY AN APPLIANCE, A CLIENT TO ACCESS A VIRTUAL PRIVATE NETWORK CONNECTION, BASED ON AN ATTRIBUTE OF A CLIENT-SIDE CERTIFICATE

FIELD OF THE INVENTION

The present invention generally relates to data communication networks. In particular, the present invention relates to a method and appliance for authenticating, by an appliance, a client to access a virtual private network connection, based on an attribute of a client-side certificate.

BACKGROUND OF THE INVENTION

Conventional methods of access control typically require receipt and evaluation of authentication credentials from a client prior to granting access. The credentials are typically presented to an access infrastructure or other security gateway, which determines what types of access may be provided to the client. In some methods, a certificate provides information associated with the client, such as a verification of a user's identity. However, conventional methods typically do not use certificate data or other authentication information when identifying a type of connection to establish with or for the user, only when identifying whether or not to grant access. Many different types of connections may be granted to or required of a user—secure connections, accelerated connections, and so on. Policies applicable to the user may indicate that to access a resource, a user is required to establish a particular type of connection, for example, a connection to a virtual private network. Alternatively, a user may qualify for improved connection quality, such as an accelerated connection. Or information about the user request, such as a time of day the request is made, or a particular resource requested, may influence a type of connection established for a user, for example, a load-balanced or traffic-managed connection. A method of determining types of connections responsive to authentication information associated with a user would be desirable in providing access to proprietary resources in a networked environment.

SUMMARY OF THE INVENTION

In one aspect, a method for authenticating, by an appliance, a client to access a virtual network connection, based on an attribute of a client-side certificate, includes the step of requesting a client authentication certificate from a client. A value of at least one field in the client authentication certificate received from the client is identified. One of a plurality of types of access is assigned responsive to an application of a policy to the identified value of the at least one field, each of the plurality of access types associated with at least one connection characteristic.

In one embodiment, a client authentication certificate comprising a Secure Socket Layer (SSL) certificate is requested from the client. In another embodiment, the identified value of the at least one field identifies a username associated with a user of the client. In still another embodiment, the identified value of the at least one field identifies a group of users with which a user of the client is associated. In yet another embodiment, the identified value of the at least one field identifies a policy applicable to a user of the client.

In one embodiment, a user interface having a user name field displaying the identified value of the at least one field is displayed on the client. In another embodiment, a password is received from a user of the client via a password field of the user interface. In still another embodiment, a value of a second field in the client authentication certificate is identified. In yet another embodiment, authorization is granted based on the identified value of the second field.

In one embodiment, the user is authenticated to a first authentication service responsive to the identified value and to a password provided by the user of the client. In another embodiment, the first authentication service comprises an external authentication server. In still another embodiment, the first authentication service comprises an authentication database of the appliance. In yet another embodiment, the user is authenticated to a second authentication service.

In one embodiment, one of a plurality of types of access is assigned, the assigned type of access associated with a connection characteristic identifying an accelerated connection. In another embodiment, one of a plurality of types of access is assigned, the assigned type of access associated with a connection characteristic identifying a load-balanced connection. In still another embodiment, one of a plurality of types of access is assigned, the assigned type of access associated with a connection characteristic identifying a traffic-managed connection. In yet another embodiment, one of a plurality of types of access is assigned, the assigned type of access associated with a connection characteristic identifying a session-managed connection.

In another aspect, an appliance for authenticating a client to access a virtual private network connection based on an attribute of a client-side certificate comprises a means for requesting a client authentication certificate from a client. The appliance comprises a means for identifying a value of at least one field in the client authentication certificate received from the client. The appliance comprises a means for assigning one of a plurality of types of access responsive to application of a policy to the identified value of the at least one field, each of the plurality of access types associated with at least one connection characteristic.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
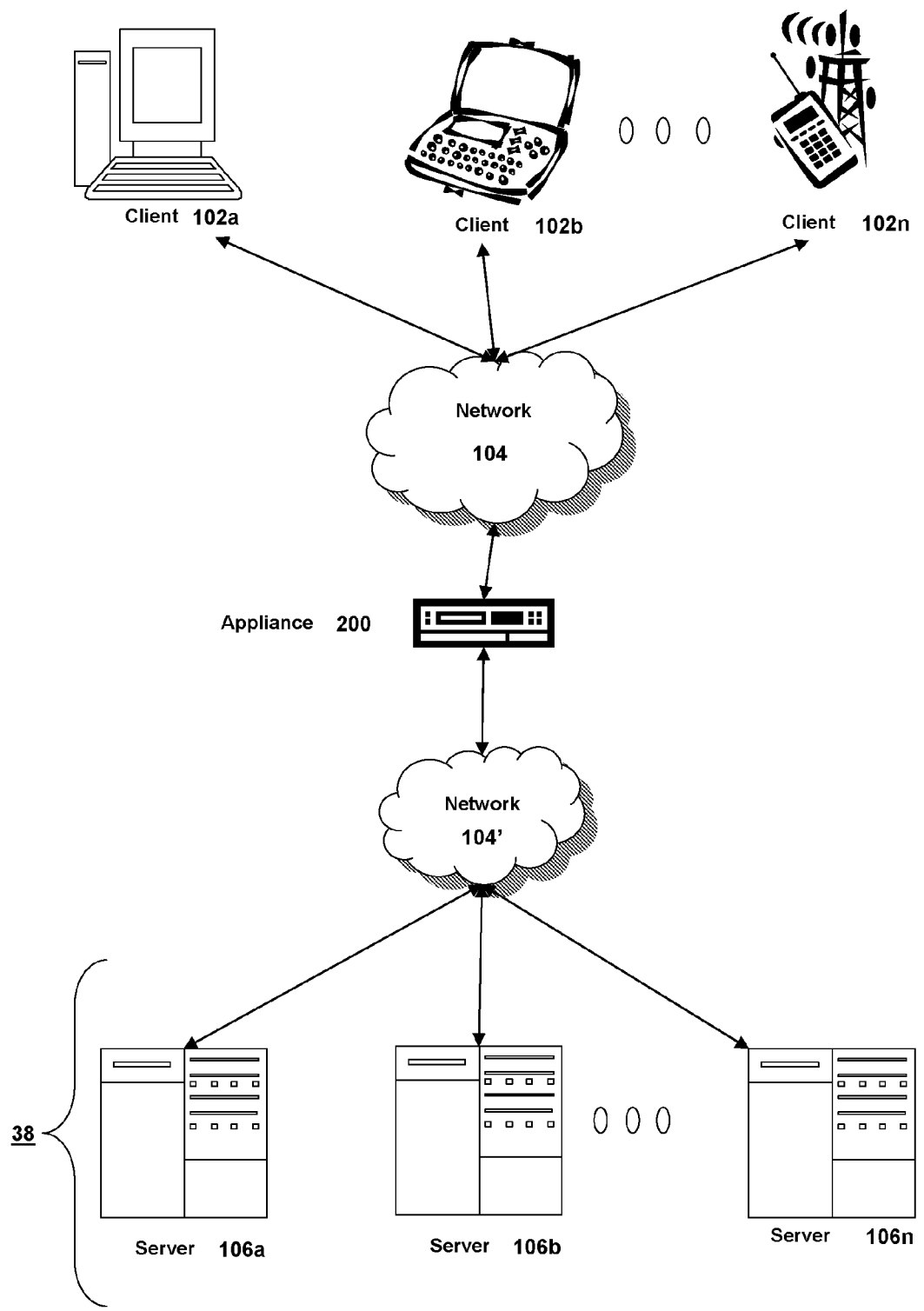
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
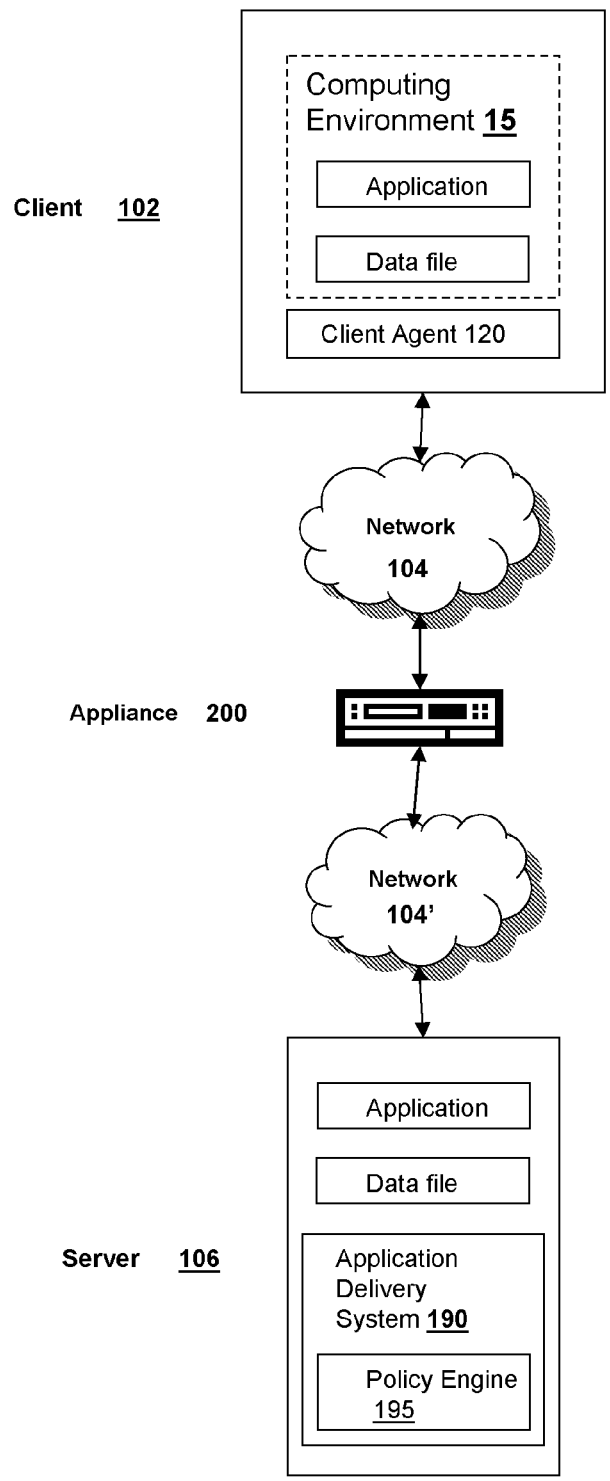
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Figure 1C:
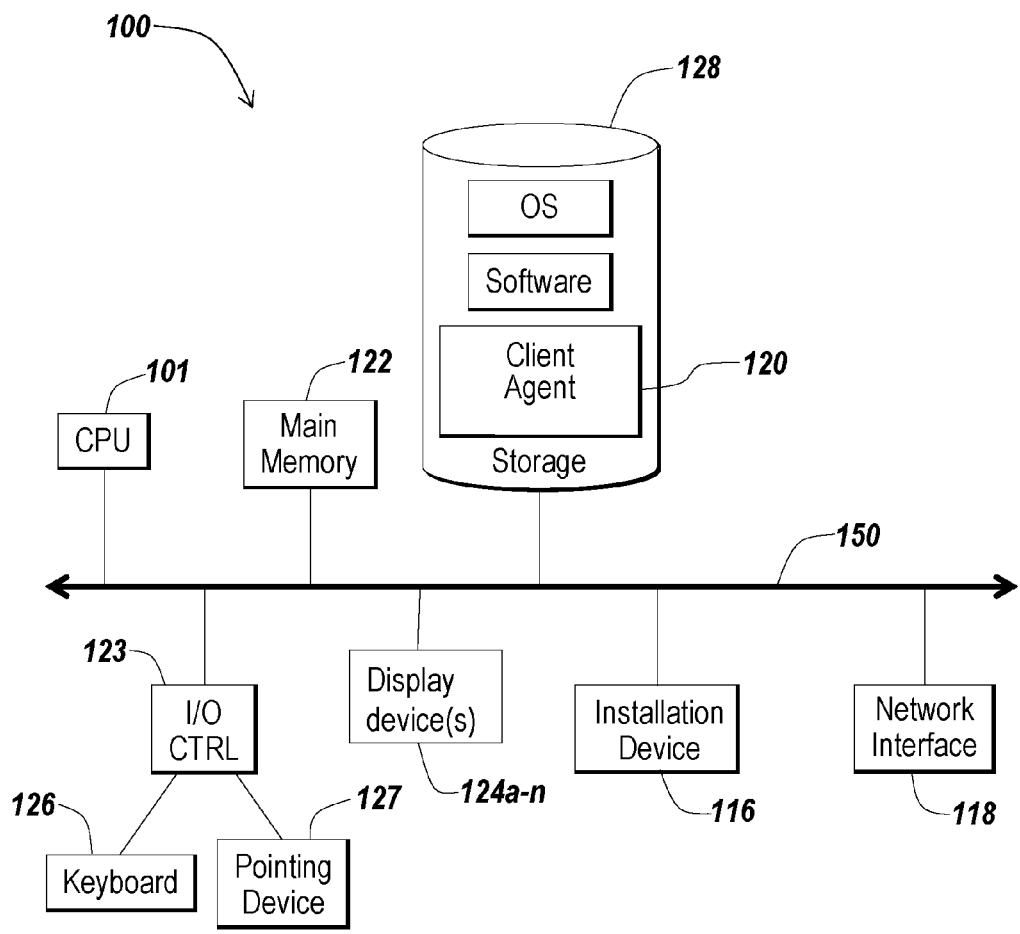
FIGS. 1C and 1D are block diagrams of embodiments of a computing device.
Figure 1D:
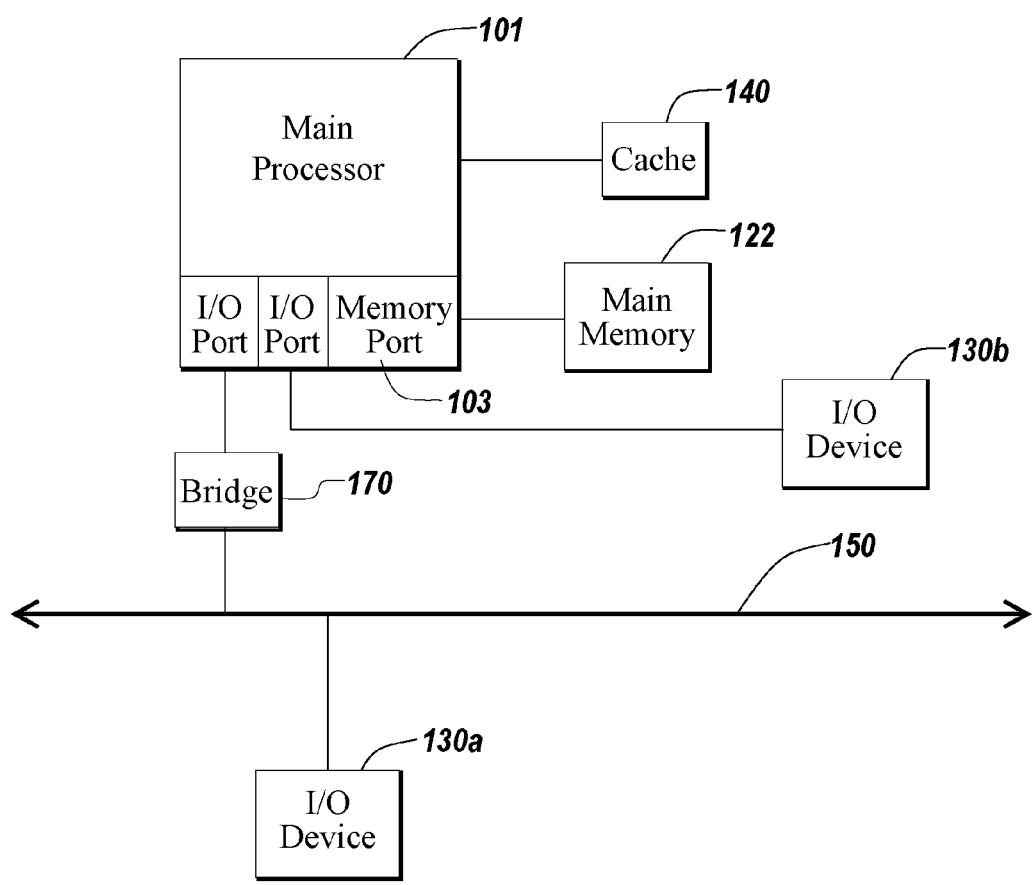

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 121, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various busses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1D depicts an embodiment of a computer 100 in which the main processor 121 communicates directly with I/O device 130b via HyperTransport, Rapid I/O, or InfiniBand. FIG. 1D also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 1106a-1106n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2A:
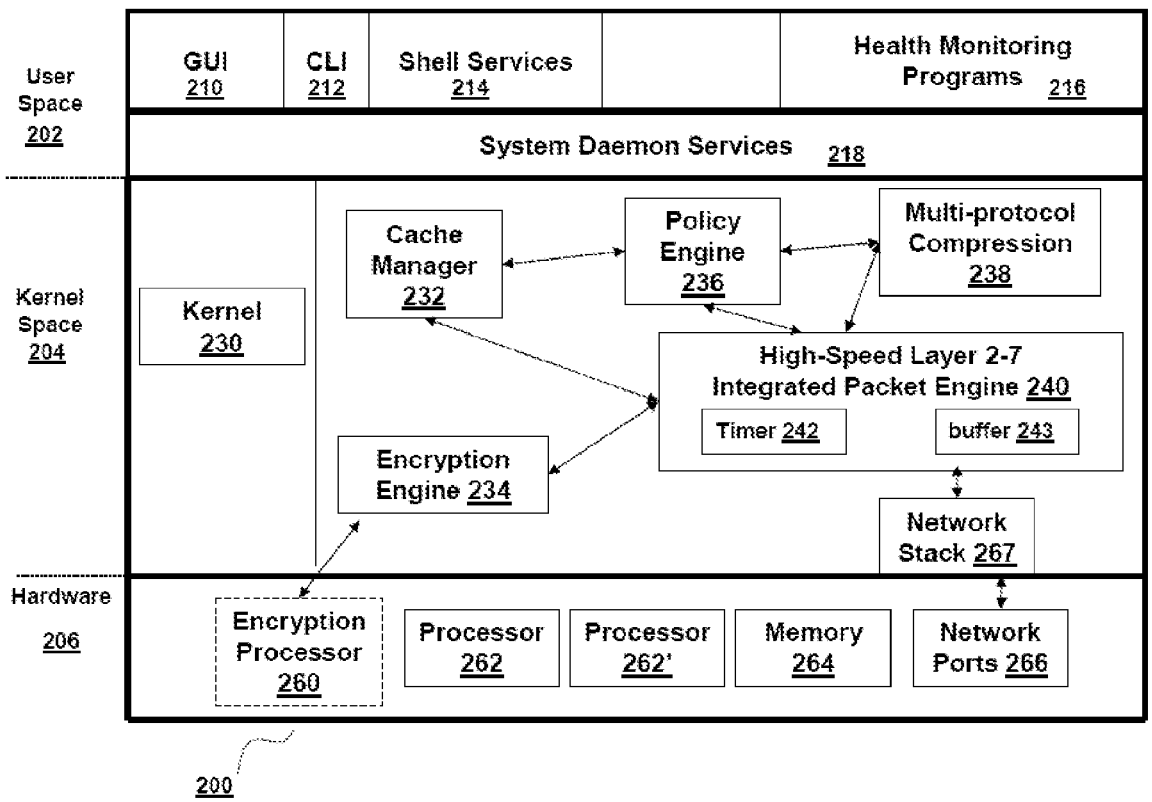
FIG. 2A is a block diagram of an embodiment of an appliance for processing communications between a client and a server.

FIG. 2A is a block diagram depicting one embodiment of an appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 121 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the appliance 200. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 104, and with a second network 104'. In some embodiments, the appliance 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the appliance 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the appliance 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of appliance 200. In other embodiments, the cache memory element may comprise memory having a faster access time than memory 264. In another embodiment, the cache memory element may comprise any type and form of storage element of the appliance 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the encryption processor 260. In other embodiments, the encryption engine 234 comprises executable instructions running on the encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
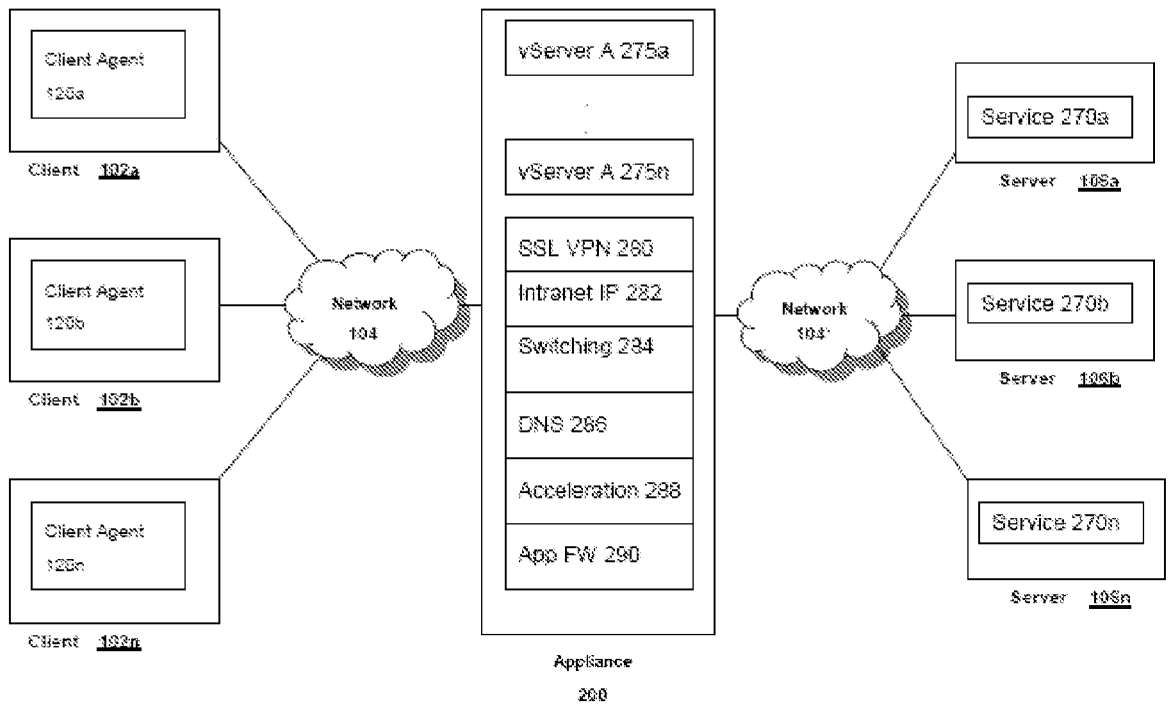
FIG. 2B is a block diagram of another embodiment of an appliance for optimizing, accelerating, load-balancing and routing communications between a client and a server.

Referring now to FIG. 2B, a block diagram depicts another embodiment of the appliance 200. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred to herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 270 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102. In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides an SSL VPN connection 280 between a client 102 and a server 106. For example, a client 102 on a first network 104 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol, or intranetIP, 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is a network identifier, such as IP address and/or host name, for the client 102 on the second network 104'. The appliance 200 listens for and receives on the second or private network 104' any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Figure 3:
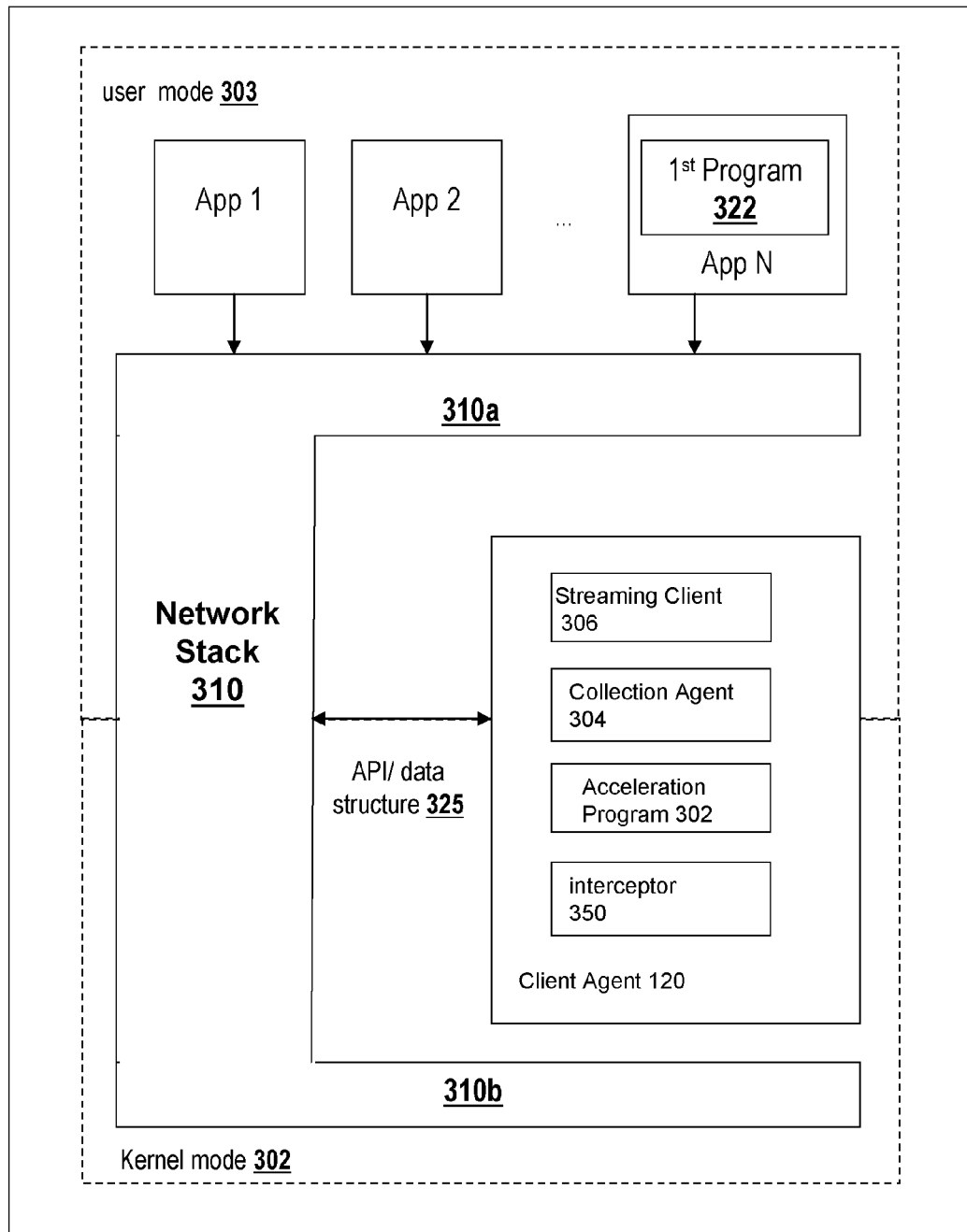
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. Other embodiments of the application client include a Remote Display Protocol (RDP) client, developed by Microsoft Corporation of Redmond, Wash., an X-Windows client, a client-side player, interpreter or simulator capable of executing multimedia applications, email, Java, or .NET code. Moreover, in one embodiment the output of an application executing on the server 106 can be displayed at the client 102 via the ICA client.

In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as payload of network packet of the transport layer protocol The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Communication between a program neighborhood-enabled client 102 and a server 106 may occur over a dedicated virtual channel that is established on top of an ICA virtual channel. In other embodiments, the communication occurs using an XML service. In still other embodiments, the client 102 runs a client-side dialog that acquires the credentials of a user of the client 102. In some embodiments, a user management subsystem on a server 106 receiving the credentials of the user may return a set of distinguished names representing the list of accounts to which the user belongs. Upon authentication, the server 106 may establish a program neighborhood virtual channel, a control channel, or other communications channel. In some embodiments, an acceleration program 302 may also be transmitted to the client 102 in response to a client 102 request.

C. A Method and Appliance for Authenticating, by an Appliance, a Client to Access a Virtual Private Network Connection Based on an Attribute of a Client-Side Certificate In some embodiments, a client 102 may use the client agent 120 to browse farms 38, servers 106, and applications in the farms 38. In one embodiment, each server 106 includes an ICA browsing subsystem to provide the client 102 with browsing capability. After the client 102 establishes a connection with the ICA browser subsystem of any of the servers 106, that browser subsystem supports a variety of client 102 requests. Such requests include: (1) enumerating names of servers in the farm, (2) enumerating names of applications published in the farm, (3) resolving a server name and/or application name to a server address that is useful to the client 102. The ICA browser subsystem also supports requests made by clients 102 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, a user of the client 102 selects an application for execution from a received enumeration of available applications. In another embodiment, the user selects an application for execution independent of the received enumeration. In some embodiments, the user selects an application for execution by selecting a graphical representation of the application presented on the client 102 by a client agent 120. In other embodiments, the user selects an application for execution by selecting a graphical representation of the application presented to the user on a web server or other server 106. In some embodiments, an appliance 200 or acceleration program 302 accelerates delivery of the graphical representation. In some embodiments, an appliance 200 caches or stores the graphical representation. In some embodiments an appliance 200 may cache or store any and all of the associated applications or portions of the associated applications.

In some embodiments, when a client 102 connects to the network 104, the user of the client 102 provides user credentials. User credentials may include the username of a user of the client 102, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client 102 can be obtained and submitted for authentication. The server 106 responding to the client 102 can authenticate the user based on the user credentials.

In some embodiments, the client 102 provides credentials upon making a request for execution of an application to a server 106, directly or through an appliance 200. In one of these embodiments, the client 102 requests access to an application residing on a server 106. In another of these embodiments, the client 102 requests access to a network on which a desired resource resides. In other embodiments, the client 102 provides credentials upon making a request for a connection to an appliance 200. In one of these embodiments, the client 102 requests access to a virtual private network. In another of these embodiments, the client 102 requests a network address on the virtual private network. In still another of these embodiments, the client 102 initiates a connection to the appliance 200.

In some embodiments, the user provides credentials to the server 106 or appliance 200 via a graphical user interface presented to the client 102 by the server 106 or appliance 200. In other embodiments, a server 106 or appliance 200 having the functionality of a web server provides the graphical user interface to the client 102. In still other embodiments, a collection agent transmitted to the client 102 by the server 106 or appliance 200 gathers the credentials from the client 102.

In one embodiment, a credential refers to a username and password. In another embodiment, a credential is not limited to a username and password but includes, without limitation, a machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials.

In some embodiments, a credential associated with a client 102 is associated with a user of the client 102. In one of these embodiments, the credential is information possessed by the user. In another of these embodiments, the credential is user authentication information. In other embodiments, a credential associated with a client is associated with a network. In one of these embodiments, the credential is information associated with a network to which the client may connect. In another of these embodiments, the credential is information associated with a network collecting information about the client. In still other embodiments, a credential associated with a client is a characteristic of the client.

In some embodiments, the user authentication performed by the server 106 or appliance 200 may suffice to authorize the use of each hosted application program presented to the client 102, although such applications may reside at another server 106'. Accordingly, when the client 102 launches (i.e., initiates execution of) one of the hosted applications, additional input of user credentials by the client 102 may be unnecessary to authenticate use of that application. Thus, a single entry of the user credentials may serve to determine the available applications and to authorize the launching of such applications without an additional, manual log-on authentication process by the user.

In one embodiment, an appliance 200 receives a request for access to a resource from a client 102. In another embodiment, the appliance 200 receives a request for access to a virtual private network. In still another embodiment, the appliance 200 makes a determination as to whether to grant access and what level of access to grant. In yet another embodiment, the appliance 200 makes a determination as to what type of connection to establish when providing the client with access to the application.

In some embodiments, decisions regarding whether and how to grant a user access to a requested resource are made responsive to determinations by a policy engine regarding whether and how a client 102 may access an application. In one of these embodiments, a decision regarding a level of access is made responsive to a policy engine determination. In another of these embodiments, a decision regarding a type of access is made responsive to a policy engine determination. In still another of these embodiments, a decision regarding a type of connection is made responsive to a policy engine determination. The policy engine may collect information about the client 102 prior to making the determination. In some embodiments, the policy engine resides on the appliance 200. In other embodiments, the appliance 200 is in communication with a police engine residing on a server 106.

Figure 4:
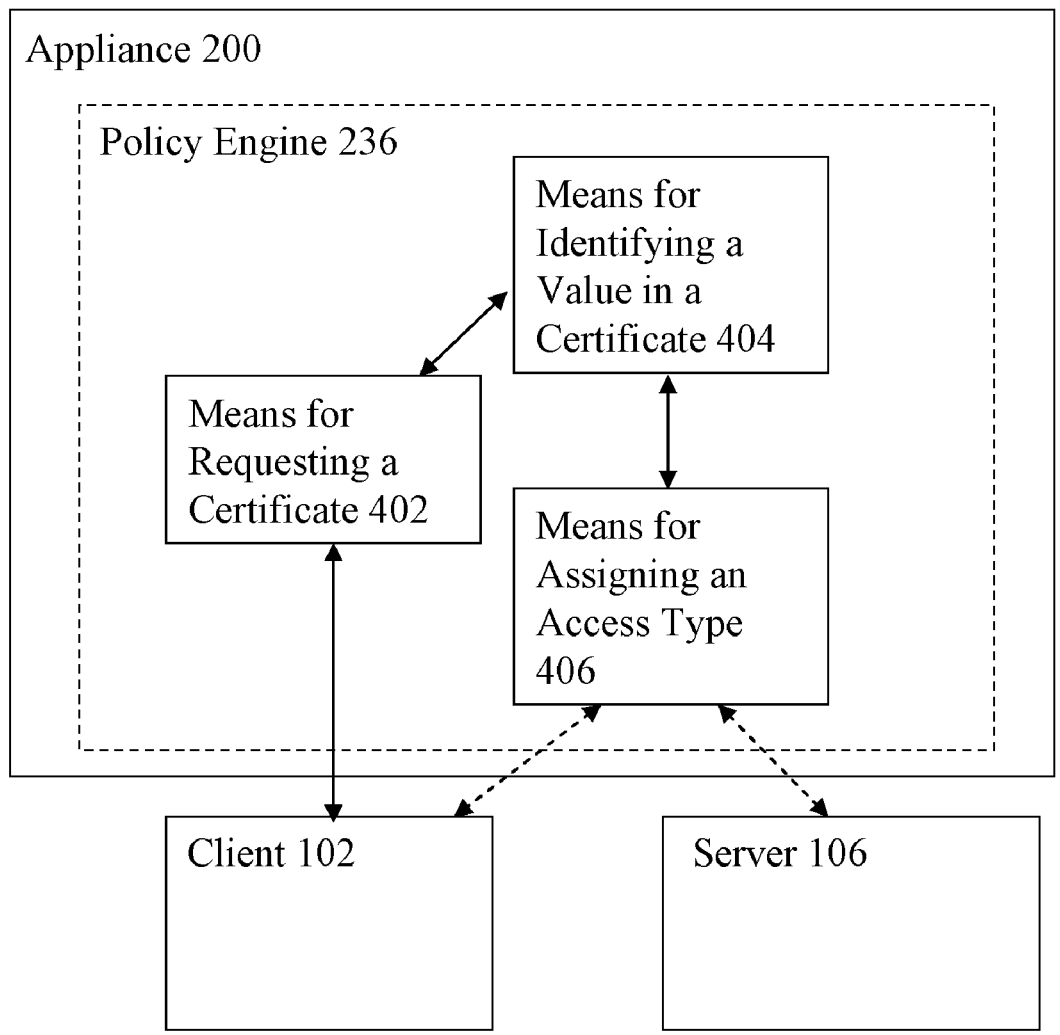
FIG. 4 is a flow diagram depicting one embodiment of the steps taken in a method for authenticating, by an appliance a client to access a virtual private network connection, based on an attribute of a client-side certificate.

Referring now to FIG. 4, a block diagram depicts one embodiment of an appliance for authenticating a client to access a virtual private network connection, based on an attribute of a client-side certificate. In brief overview, the appliance includes a means for requesting a certificate (402), a means for identifying a value in a certificate (404), and a means for assigning an access type (406). The means for requesting the certificate 402 requests a client authentication certificate. The means for identifying the value in the certificate 404 identifies a value of at least one field in the client authentication certificate received from the client. The means for assigning an access type 406 assigns one of a plurality of types of access responsive to an application of a policy to the identified value of the at least one field, each of the plurality of access types associated with at least one connection characteristic.

In some embodiments, as depicted in shadow in FIG. 4, the means for requesting a certificate 402, the means for identifying a value in a certificate 404, and the means for assigning an access type 406 reside on the policy engine 236 in the appliance 200. In one of these embodiments, the means for requesting a certificate 402 comprises a transmitter sending the request to the client 102 over a control connection. In another of these embodiments, the means for identifying a value in a certificate 404 comprises a certificate inspector extracting a value of a field in a certificate. In still another of these embodiments, the means for assigning an access type 406 comprises a policy application component accessing a policy database to assign the access type.

The means for requesting the certificate 402 requests a client authentication certificate. In one embodiment, the means for requesting the certificate 402 further comprises a means for requesting from a client a client authentication certificate comprising a Secure Socket Layer (SSL) certificate. In another embodiment, the means for requesting the certificate 402 further comprises a means for requesting from a client a client authentication certificate comprising an X.509 certificate. In still another embodiment, the means for requesting the certificate 402 further comprises a means for requesting from a client a client authentication certificate comprising a certificate by an administrator or user.

In one embodiment, the means for requesting the certificate 402 further comprises a means for denying authentication of a user of the client if the client authentication certificate is not received. In still another embodiment, the means for requesting further the certificate 402 comprises a means for requesting the client authentication certificate from the client in response to a failed authentication attempt by a user of the client.

In one embodiment, the means for requesting the certificate 402 can comprise logic, functions or operations, software, hardware or any combination of software and hardware to request a client authentication certificate from the client 102. In another embodiment, the means for requesting the certificate 402 can comprise any type and form of application, program, service, process, task, thread or executable instruction. In still another embodiment, the means for requesting the certificate 402 may comprise any component or portion of the appliance 200, as illustrated in FIG. 2A. In yet another embodiment, the means for requesting the certificate 402 resides in the policy engine 236 on the appliance 200. In a further embodiment, the means for requesting the certificate 402 is a transmitter residing on the appliance 200 and communicating with the client 102 over a control connection.

In one embodiment, the means for requesting the certificate 402 further comprises a means for identifying a value of a field, the value identifying a user name associated with a user of the client. In another embodiment, the means for requesting the certificate 402 further comprises a means for identifying a value of a field, the value identifying a group of users with which a user of the client is associated. In still another embodiment, the means for requesting the certificate 402 includes a means for identifying a value of a field, the value identifying a policy applicable to a user of the client.

In one embodiment, the means for requesting the certificate 402 further comprises a means for identifying a value of a field, the value identifying a network address of the client 102. In another embodiment, the means for requesting the certificate 402 further comprises a means for identifying a value of a field, the value identifying an application executing on the client 102. In still another embodiment, the means for requesting the certificate 402 further comprises a means for identifying a value of a field, the value identifying an operating system attribute of an operating system executing on the client 102.

In some embodiments, the means for requesting the certificate 402 further comprises a means for identifying a value of a field, the value identifying an attribute of the certificate. In one of these embodiments, the means for requesting the certificate 402 further comprises a means for identifying a value of a field, the value identifying an issuer of the certificate. In another of these embodiments, the means for requesting the certificate 402 further comprises a means for identifying a value of a field, the value identifying a period of time during which the certificate is valid. In still another of these embodiments, the means for requesting the certificate 402 further comprises a means for identifying a value of a field, the value identifying a serial number associated with the certificate.

The means for identifying the value in the certificate 404 identifies a value of at least one field in the client authentication certificate received from the client. In one embodiment, the means for identifying the value in the certificate 404 comprises a means for receiving from the user the first user name via a login page. In another embodiment, the means for identifying the value in the certificate 404 comprises a means for comparing a user name identified as a value in the client authentication certificate with the first user name. In still another embodiment, the means for identifying the value in the certificate 404 comprises a means for determining that the user name and the first user name differ, a means for requesting a second user name and a second password from the user via a user interface on the client, and a means for authenticating the second user name and the second password to a second authentication service. In yet another embodiment, the means for identifying the value in the certificate 404 comprises a means for determining that the user name and the first user name are the same and authenticating the first user name and the password to a second authentication service.

In one embodiment, the means for identifying the value in the certificate 404 can comprise logic, functions or operations, software, hardware or any combination of software and hardware to identify a value in a field of a client authentication certificate. In another embodiment, the means for identifying the value in the certificate 404 can comprise any type and form of application, program, service, process, task, thread or executable instruction. In still another embodiment, the means for identifying the value in the certificate 404 may comprise any component or portion of the appliance 200, as illustrated in FIG. 2A. In yet another embodiment, the means for identifying the value in the certificate 404 resides in the policy engine 236 on the appliance 200.

The means for assigning an access type 406 assigns one of a plurality of types of access responsive to an application of a policy to the identified value of the at least one field, each of the plurality of access types associated with at least one connection characteristic. In one embodiment, the means for assigning an access type 406 resides in an appliance 200 and comprises a means for applying a policy to the identified value. In another embodiment, the means for assigning an access type 406 comprises a means for transmitting the identified value to a policy engine. In still another embodiment, the means for assigning an access type 406 comprises a means for receiving a result of a policy application by the policy engine to the identified value. In some embodiments, the means for assigning an access type 406 transmits the assignment to the client 102. In other embodiments, the means for assigning an access type 406 transmits the assignment to a server 106'. In still other embodiments, the means for assigning an access type 406 initiates, from the appliance 200, establishment of a connection for the client 102, the connection have the assigned access type.

In one embodiment, the means for assigning an access type 406 comprises means for assigning, by a policy engine, one of a plurality of types of access responsive to application of a policy to the identified value. In another embodiment, the means for assigning an access type 406 comprises a means for authenticating the user to a first authentication service responsive to the identified value and to a password provided by the user of the client. In still another embodiment, the first authentication service comprises an external authentication server. In yet another embodiment, the first authentication services comprises an authentication database of an appliance, such as the appliance 200. In a further embodiment, the means for assigning an access type 406 comprises a means for authenticating a user of the client to a second authentication service, responsive to a first user name and a password if identification of the first value fails.

In one embodiment, the means for assigning an access type 406 can comprise logic, functions or operations, software, hardware or any combination of software and hardware to assign an access type responsive to a value in a certificate field. In another embodiment, the means for assigning an access type 406 can comprise any type and form of application, program, service, process, task, thread or executable instruction. In still another embodiment, the means for assigning an access type 406 may comprise any component or portion of the appliance 200, as illustrated in FIG. 2A. In yet another embodiment, the means for assigning an access type 406 resides in the policy engine 236 on the appliance 200. In a further embodiment, the means for assigning an access type 406 is in communication with a policy database.

In one embodiment, a user of a client 102 initiates a connection to an appliance 200. In another embodiment, the appliance 200 identifies a certificate policy associated with the user and identifies and requests from the user authentication information required for authentication and identified by the policy.

In some embodiments, a certificate policy indicates that an authentication policy applies to the user request for access. In one of these embodiments, the certificate policy indicates that the authentication policy applies because the user is associated with a particular network address. In another of these embodiments, the authentication policy specifies that the user must satisfy two-factor authentication. In still another of these embodiments, the authentication policy specifies that the user must provide a client authentication certificate identifying a user name associated with the user and that the user must also provide a password. In yet another of these embodiments, the certificate policy indicates that a value should be extracted from a second field in the client authentication certificate for determining a group name of a group in which the user is a member.

In other embodiments, a certificate policy indicates that an authentication policy applies to the user request for access, the authentication policy specifying that a user need not provide a client authentication certificate. In one of these embodiments, the certificate policy indicates that the authentication policy applies because the user is associated with a particular network address. In another of these embodiments, the authentication policy specifies that the user may provide a user name and password via a user interface on a login page presented to the user. In still another of these embodiment, the authentication policy specifies that the user name associated with the user must be identified from a value of a field in a client authentication certificate, instead of from a user interface on a login page presented to the user.

The means for assigning an access type 406 comprises a means for assigning one of a plurality of types of access, each of the plurality of access types associated with at least one connection characteristic. In one embodiment, the connection characteristic identifies an accelerated connection. In another embodiment, the connection characteristic identifies a load-balanced connection. In still another embodiment, the connection characteristic identifies a traffic-managed connection. In yet another embodiment, the connection characteristic identifies a session-managed connection. In some embodiment, the connection characteristic identifies a type of connection to establish to satisfy a policy applicable to the user.

In one embodiment, the means for assigning an access type 406 assigns a type of connection responsive to an application of a policy to a value of a field in the certificate. In another embodiment, the appliance 200 assigns the type of connection. In still another embodiment, the means for assigning an access type 406 assigns a type of connection responsive to an authentication policy. In yet another embodiment, the means for assigning an access type 406 assigns a type of connection responsive to an authorization policy.

In one embodiment, the means for assigning an access type 406 assigns a type of connection responsive to an auditing policy. In another embodiment, the means for assigning an access type 406 assigns a type of connection responsive to a session management policy. In still another embodiment, the means for assigning an access type 406 assigns a type of connection responsive to a traffic-management policy. In yet another embodiment, the means for assigning an access type 406 assigns a type of connection responsive to a load-balancing policy.

In some embodiments, the means for assigning an access type 406 assigns a type of accelerated connection. In one of these embodiments, the means for assigning an access type 406 may assign a type of accelerated connection providing TCP multiplexing. In another of these embodiments, the means for assigning an access type 406 may assign a type of accelerated connection providing TCP pooling. In still another of these embodiments, the means for assigning an access type 406 may assign a type of accelerated connection providing TCP compression. In yet another of these embodiments, the means for assigning an access type 406 may assign a type of accelerated connection providing TCP buffering. In one of these embodiments, the means for assigning an access type 406 may assign a type of accelerated connection providing caching. In another of these embodiments, the means for assigning an access type 406 may assign a type of accelerated connection providing any one or more of the acceleration techniques 288 described in greater detail above in connection with FIG. 2B.

In other embodiments, the means for assigning an access type 406 assigns a type of load-balanced connection. In one of these embodiments, the means for assigning an access type 406 assigns a type of load-balanced connection that connects the client 102 to one of a plurality of server farms 38, the server farm 38 selected responsive to a load-balancing decision. In another of these embodiments, the means for assigning an access type 406 assigns a type of load-balanced connection that connects the client 102 to a server 106 selected responsive to a load-balancing decision. In still another of these embodiments, the means for assigning an access type 406 assigns a type of load-balanced connection that connects the client 102 to a server 106 selected responsive to a global-server load-balancing policy. In yet another embodiment, the means for assigning an access type 406 assigns a type of load-balanced connection that connects the client 102 to an appliance 200 selected responsive to a load-balancing policy. In some embodiments, the means for assigning an access type 406 assigns a type of load-balanced connection that connects the client 102 to one of a plurality of vServers 275, the vServers 275 selected responsive to a load-balancing decision.

In still other embodiments, the means for assigning an access type 406 assigns a type of session-managed connection. In one of these embodiments, the means for assigning an access type 406 assigns a type of session-managed connection applying a compression technique to traffic transmitted over the connection. In another of these embodiments, the means for assigning an access type 406 assigns a type of session-managed connection established responsive to an application of a policy defining SSL characteristics of the connection. In still another of these embodiments, the means for assigning an access type 406 assigns a type of session-managed connection implementing a type of compression.

In yet other embodiments, the means for assigning an access type 406 assigns a type of audited connection. In one of these embodiments, the means for assigning an access type 406 assigns a type of audited connection in which a type of packet traffic transmitted over the connection is logged. In another of these embodiments, the means for assigning an access type 406 assigns a type of audited connection in which a particular server 106 audits communications sent over the audited connection. In still another of these embodiments, the means for assigning an access type 406 assigns a type of audited connection in which a particular audit log stores the audit records for communications sent over the audited connection.

Figure 5:
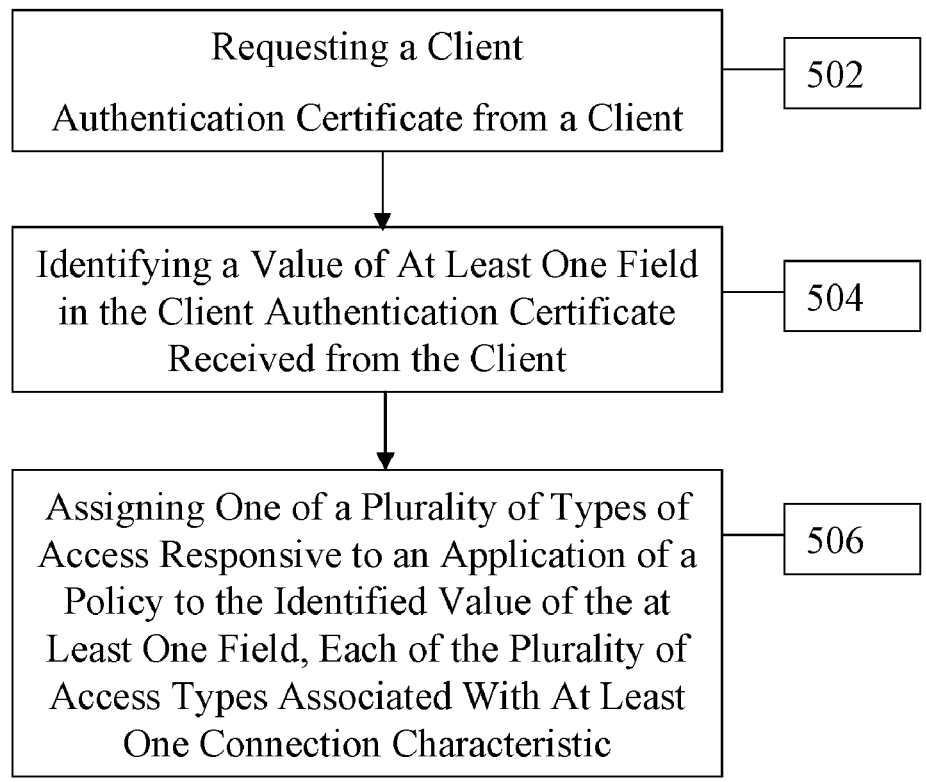
FIG. 5 is a block diagram depicting one embodiment of a system for authenticating, by an appliance a client to access a virtual private network connection, based on an attribute of a client-side certificate.

Referring now to FIG. 5, a flow diagram depicts one embodiment of the steps taken in a method for authenticating, by an appliance, a client to access a virtual private network connection, based on an attribute of a client-side certificate. In brief overview, a client authentication certificate is requested from a client (step 502). A value is identified of at least one field in the client authentication certificate received from the client (step 504). One of a plurality of types of access is assigned responsive to an application of a policy to the identified value of the at least one field, each of the plurality of access types associated with at least one connection characteristic (step 506).

Referring now to FIG. 5, and in greater detail, a client authentication certificate is requested from a client (step 502). In one embodiment, a client authentication certificate comprising a Secure Socket Layer (SSL) certificate is requested from the client. In another embodiment, an appliance, such as the appliance 200, requests the client authentication certificate. In still another embodiment, the client authentication certificate is requested from the client responsive to a request by the client for establishment of a virtual private network connection.

In one embodiment, the client authentication certificate is requested from the client responsive to a request by the client for access to a resource, such as an application, a server, a network, or a connection to any of these. In another embodiment, the client authentication certificate is requested from the client in response to a failed attempt to authenticate a user of the client responsive to credentials provided to a user interface on a login page. In still another embodiment, authentication of a user of the client is denied if the client authentication certificate is not received.

A value is identified of at least one field in the client authentication certificate received from the client (step 504). In one embodiment, the value identifies a username associated with a user of the client. In another embodiment, the value identifies a group of users with which a user of the client is associated. In still another embodiment, the value identifies a policy applicable to a user of the client.

In one embodiment, a user interface is displayed on the client, the user interface having a user name field displaying the identified value. In another embodiment, a password is received from a user of the client via a password field of the user interface. In still another embodiment, a non-modifiable field is displayed in the user interface. In yet another embodiment, the non-modifiable field displays a value of a second field in the client authentication certificate.

In some embodiments, a user provides a user name and password via the user interface. In one of these embodiments, the user name and password suffice to authenticate and authorize the user. In another of these embodiments, the user optionally provides a client authentication certificate. In still another of these embodiments, the user provides a first factor of authentication by providing credentials, such as a user name or password, via a user interface and provides a second factor of authentication via the client authentication certificate. In one embodiment, an appliance 200 is configured to include an authentication policy identifying what information to request from the user and what format to specify for the requested information. In another embodiment, an appliance 200 is configured to include a certificate policy identifying a value of at least one field in a client authentication certificate for inspection by the appliance 200.

In other embodiments, the appliance 200 requires receipt of the client authentication certificate to authenticate or authorize the user. In one of these embodiments, the user is authenticated or authorized solely by the presentation of the client authentication certificate to the appliance 200. In another of these embodiments, the appliance makes an authentication and authorization decision responsive to a value of at least one field in the client authentication certificate. In still another of these embodiments, a user name or a group name are identified by values in the fields in the client authentication certificate. In yet another of these embodiments, the appliance 200 identifies a policy applicable to the user responsive to a user name or a group name identified by a value in the client authentication certificate.

In still other embodiments, the appliance 200 requests receipt of the client authentication certificate and of a password to authenticate or authorize the user. In one of these embodiments, the user provides a first factor of authentication via the client authentication certificate and a second factor of authentication by providing a password via a user interface. In another of these embodiments, the appliance 200 requires the user to provide a user name or a group name via the user interface in addition to providing the password via the user interface. In still another of these embodiments, the appliance 200 identifies a user name or a group name as a value of a field in the client authentication certificate.

In one of these embodiments, the appliance 200 extracts a user name from a first field in the certificate and requests a password from the client. In another of these embodiments, the appliance 200 fails to identify a user name in the certificate and instead requests a user name and password from the user. In still another of these embodiments, the appliance 200 extracts a user name from a second field in the certificate. In yet another of these embodiments, the appliance 200 determines that the value of the second field and of the first field, or of the user name provided by the user, are the same and authenticates the user responsive to the value of the second field and the previously provided password. In a further of these embodiments, the appliance 200 determines that the value of the second field and of the first field, or of the user name provided by the user, are not the same, requests a second password from the user, and authenticates the user to a second authentication service with the value of the second field and with the second password.

In yet other embodiments, the appliance 200 requires a client authentication certificate only upon failure of the user to provide a valid user name and password. In one of these embodiments, the user accesses a login page requesting user name and password. In another of these embodiments, authentication of the received user name and password fails. In still another of these embodiments, the appliance 200 requests a client authentication certificate. If the client does not provide the certificate, the authentication fails and the user request is denied. If the client does provide the certificate, the appliance 200 extracts a username from the certificate. In yet another embodiment, the appliance 200 requests a password from the user and attempts to authenticate the user responsive to the extracted user name and the provided password.

In some embodiments, the appliance 200 determines that an extracted user name matches a user name provided via a user interface on a login page. In one of these embodiments, the appliance 200 uses a different authentication service to authenticate the provided user name and password than the authentication service the appliance 200 used in the first attempt to authenticate the user name and password provided via the user interface on the login page. In other embodiments, the appliance 200 determines that the extracted user name does not match the user name provided via a user interface on a login page. In one of these embodiments, the appliance 200 requests a password from the user and uses the first authentication service to authenticate the user based on the extracted user name and the provided password.

In one embodiment, a value of a second field is identified in the client authentication certificate. In another embodiment, a value of a second field is identified, the value identifying a group name in the client authentication certificate. In still another embodiment, a group authorization policy is assigned to a user of the client, based on the value of the second field.

In one embodiment, a first user name is received from a user of the client via a login page. In another embodiment, the first user name is compared with a user name identified by a value of a field in the client authentication certificate. In still another embodiment, a determination is made that the first user name and the user name identified by the certificate differ, a second user name and a second password are requested from the user via a user interface on the client, and the second user name and the second password are authenticated. In yet another embodiment, the second user name and the second password are authenticated to an authentication service. In a further embodiment, a determination is made that the first user name and the user name identified by the certificate are the same and the first user name and a received password are authenticated to an authentication service. In some embodiments, the first user name and the received password are authenticated to a first authentication service and the second user name and the second password are authenticated to a second authentication service. In other embodiments, both the first user name and the received password and the second user name and the second password are authenticated to the second authentication service.

One of a plurality of types of access is assigned responsive to an application of a policy to the identified value of the at least one field, each of the plurality of access types associated with at least one connection characteristic (step 506). In one embodiment, an appliance, such as the appliance 200, applies the policy and assigns a type of access responsive to the application. In another embodiment, the identified value is transmitted to a policy engine for application of the policy to the identified value. In still another embodiment, an appliance, such as the appliance 200, receives a result of a policy application by a policy engine. In yet another embodiment, a policy engine assigns one of a plurality of types of access, responsive to application of a policy to the identified value.

In one embodiment, a user of the client is authenticated to a first authentication service responsive to the identified value and to a password provided by the user of the client. In another embodiment, the first authentication service is an external authentication server. In still another embodiment, the first authentication service is an authentication database of an appliance, such as the appliance 200. In some embodiments, a user is authenticated to and granted a type of access by a first authentication service responsive to the identified value of the at least one field of the client authentication certificate. In one of these embodiments, the user is authenticated to and granted a second type of access by a second authentication service responsive to an identified value of a second field in the client authentication certificate.

In one embodiment, the user of the client is authenticated to a second authentication service, responsive to a first user name and a password. In another embodiment, the user of the client is authenticated to the second authentication service if an appliance fails to identify the first value of the identified at least one field in the client authentication certificate. In still another embodiment, the user of the client is authenticated to the second authentication service if an application of a policy to an identified value results in a denial of the authentication request.

In one embodiment, one of a plurality of types of access is assigned responsive to an application of a policy to the identified value of the at least one field. In another embodiment, the type of access assigned satisfies a request by the client for access to a resource, such as a request for execution or retrieval of an application. In still another embodiment, the type of access assigned satisfies a request by the client for establishment of a connection to a resource, such as a virtual private network. In yet another embodiment, the type of access assigned satisfies a policy specifying a type of access authorized for the user.

The type of access assigned is associated with at least one connection characteristic. In one embodiment, the connection characteristic identifies a type of connection to be established for the user of the client providing the client authentication certificate. In another embodiment, the connection characteristic identifies a load-balanced connection. In still another embodiment, the connection characteristic identifies an accelerated connection. In yet another embodiment, the connection characteristic identifies a traffic-managed connection. In a further embodiment, the connection characteristic identifies a session-managed connection. In some embodiments, the connection characteristic identifies a type of connection to establish to satisfy a policy applicable to the user. In other embodiments, the connection characteristic identifies a connection to a quarantined network, responsive to a determination that the user fails to satisfy a policy. In one of these embodiments, the quarantined network provides the user with limited access to requested resources.

In some embodiments, the appliance 200 identifies information within a client authentication certificate and selects a type of access to grant to the client 102. In one of these embodiments, the appliance 200 requests the certificate after receiving a request from the client 102. In another of these embodiments, the appliance 200 selects the type of access to grant responsive to an application of a policy to the identified information. In still another of these embodiments, the appliance 200 establishes a type of connection for the client 102 responsive to the application of the policy to the identified information. In other embodiments, the identified information includes an identification of information associated with a user of the client 102 requesting access to a network or a resource on the network. In one of these embodiments, the identified information includes an authorization group of which the client 102 is a member, members of the group having authorization to access particular types of resources across particular types of connections. In another of these embodiments, the appliance 200 uses authentication information to identify and provide a type of connection between the client and a requested resource. In still other embodiments, the appliance 200 uses a connection characteristic to identify a type of connection to establish for the client 102. In one of these embodiments, the appliance 200 establishes a connection to a quarantined network, responsive to a determination that the user fails to satisfy a policy, the quarantined network providing the user with limited access to requested resources. In another of these embodiments, the appliance 200 establishes a load-balanced connection. In still another of these embodiments, the appliance 200 establishes an accelerated connection. In yet another of these embodiments, the appliance 200 establishes a traffic-managed connection. In a further embodiment, the appliance 200 establishes a session-managed connection.

The methods and appliances described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of a method and appliance for authenticating, by an appliance, a client to access a virtual private network connection, based on an attribute of a client-side certificate, it will now become apparent to one of skill in the art that other embodiments incorporating the concepts of the invention may be used. Therefore, the invention should not be limited to certain embodiments, but rather should be limited only by the spirit and scope of the following claims.

What is claimed:

1. A method for authenticating, by an appliance, a client to access a virtual private network connection, based on an attribute of a client-side certificate, the method comprising the steps of:
    (a) requesting, by an appliance, a client authentication certificate from a client;
    (b) identifying, by the appliance, a value of at least one field in the client authentication certificate received from the client, the identified value other than a public key and an identity of a user of the client; and
    (c) applying, by the appliance, a policy to the identified value of the at least one field in the client authentication certificate received from the client, responsive to authenticating the client via the same client authentication certificate;

(d) assigning, by the appliance, one of a plurality of types of access to the authenticated client responsive to the application of the policy to the identified value of the at least one field, each of the plurality of access types characterized by at least one connection characteristic.

2. The method of claim 1, wherein step (a) further comprises requesting, from the client, the client authentication certificate comprising a Secure Socket Layer (SSL) certificate.

3. The method of claim 1, wherein step (a) further comprises denying authentication of a user of the client if the client authentication certificate is not received.

4. The method of claim 1, wherein step (a) further comprises requesting the client authentication certificate from the client in response to a failed authentication attempt by a user of the client.

5. The method of claim 1, wherein the at least one field comprises a second value, the second value comprising an identity of a user of the client.

6. The method of claim 1, wherein step (b) further comprises identifying a value of a field, the value identifying a group of users with which a user of the client is associated.

7. The method of claim 1, wherein step (b) further comprises identifying a value of a field, the value identifying a policy applicable to a user of the client.

8. The method of claim 1, wherein step (b) further comprises displaying, on the client, a user interface having a user name field displaying the identified value of the at least one field.

9. The method of claim 8, wherein step (b) further comprises receiving, from a user of the client, a password via a password field of the user interface.

10. The method of claim 8, wherein step (b) further comprises displaying a non-modifiable field in the user interface.

11. The method of claim 1, wherein step (b) further comprises identifying a second field identifying a group name in the client authentication certificate.

12. The method of claim 11, wherein step (d) further comprises assigning a group authorization policy to a user of the client based on the identified second field.

13. The method of claim 1, wherein step (b) further comprises receiving, from a user of the client, a first user name via a login page.

14. The method of claim 13, wherein step (b) further comprises comparing a user name identified as a value in the client authentication certificate with the first user name.

15. The method of claim 14, wherein step (b) further comprises determining that the user name and the first user name differ, requesting a second user name and a second password from the user via a user interface on the client, and authenticating the second user name and the second password to a second authentication service.

16. The method of claim 14, wherein step (b) further comprises determining that the user name and the first user name are the same and authenticating the first user name and the password.

17. The method of claim 1, wherein step (d) further comprises transmitting the identified value to a policy engine.

18. The method of claim 17, wherein step (d) further comprises receiving a result of a policy application by the policy engine to the identified value.

19. The method of claim 1, wherein step (d) comprises assigning, by a policy engine, one of a plurality of types of access responsive to application of a policy to the identified value.

20. The method of claim 1, wherein step (d) further comprises authenticating the user to a first authentication service responsive to the identified value and to a password provided by the user of the client.

21. The method of claim 20, wherein the first authentication service comprises an external authentication server.

22. The method of claim 20, wherein the first authentication service comprises an authentication database of the appliance.

23. The method of claim 1, wherein step (d) further comprises authenticating a user of the client to a second authentication service, responsive to a first user name and a password if identification of the first value fails.

24. The method of claim 1, wherein step (d) further comprises assigning one of a plurality of types of access, each of the plurality of access types associated with at least one connection characteristic, the connection characteristic identifying an accelerated connection.

25. The method of claim 1, wherein step (d) further comprises assigning one of a plurality of types of access, each of the plurality of access types associated with at least one connection characteristic, the connection characteristic identifying a load-balanced connection.

26. The method of claim 1, wherein step (d) further comprises assigning one of a plurality of types of access, each of the plurality of access types associated with at least one connection characteristic, the connection characteristic identifying a traffic-managed connection.

27. The method of claim 1, wherein step (d) further comprises assigning one of a plurality of types of access, each of the plurality of access types associated with at least one connection characteristic, the connection characteristic identifying a session-managed connection.

28. An appliance for authenticating a client to access a virtual private network connection, based on an attribute of a client-side certificate, the appliance comprising:
 a means for requesting a client authentication certificate from a client;
 a means for identifying a value of at least one field in the client authentication certificate received from the client, the identified value other than a public key and an identity of a user of the client;
 a means for applying a policy to the identified value of the at least one field in the client authentication certificate received from the client, responsive to authenticating the client via the same client authentication certificate; and
 a means for assigning one of a plurality of types of access to the authenticated client responsive to the application of the policy to the identified value of the at least one field, each of the plurality of access types characterized by at least one connection characteristic.

29. The appliance of claim 28, wherein the means for requesting further comprises a means for requesting, from the client, the client authentication certificate comprising a Secure Socket Layer (SSL) certificate.

30. The appliance of claim 28, wherein the means for requesting further comprises a means for denying authentication of a user of the client if the client authentication certificate is not received.

31. The appliance of claim 28, wherein the means for requesting further comprises a means for requesting the client authentication certificate from the client in response to a failed authentication attempt by a user of the client.

32. The appliance of claim 28, wherein the at least one field comprises a second value, the second value comprising an identity of a user of the client.

33. The appliance of claim 28, wherein the means for requesting further comprises a means for identifying a value of a field, the value identifying a group of users with which a user of the client is associated.

34. The appliance of claim 28, wherein the means for requesting further comprises a means for identifying a value of a field, the value identifying a policy applicable to a user of the client.

35. The appliance of claim 28, wherein the means for requesting further comprises a means for displaying on the client, a user interface having a user name field displaying the identified value of the at least one field.

36. The appliance of claim 35, the means for requesting further comprises a means for receiving, from a user of the client, a password via a password field of the user interface.

37. The appliance of claim 35, wherein the means for requesting further comprises a means for displaying a non-modifiable field in the user interface.

38. The appliance of claim 28, wherein the means for identifying further comprises a means for identifying from the client authentication certificate a second field identifying a group name.

39. The appliance of claim 38, the means for assigning further comprises a means for assigning a group authorization policy to a user of the client based on the extracted second field.

40. The appliance of claim 28, wherein the means for identifying further comprises a means for receiving from the user a first user name via a login page.

41. The appliance of claim 40, wherein the means for identifying further comprises a means for comparing a user name identified as a value in the client authentication certificate with the first user name.

42. The appliance of claim 41, wherein the means for identifying further comprises a means for determining that the user name and the first user name differ, a means for requesting a second user name and a second password from the user via a user interface on the client, and a means for authenticating the second user name and the second password to a second authentication service.

43. The appliance of claim 41, wherein the means for identifying further comprises a means for determining that the user name and the first user name are the same and authenticating the first user name and the password to a second authentication service.

44. The appliance of claim 28, wherein the means for assigning further comprises a means for applying a policy to the identified value.

45. The appliance of claim 28, wherein the means for assigning further comprises a means for transmitting the identified value to a policy engine.

46. The appliance of claim 45, wherein the means for assigning further comprises a means for receiving a result of a policy application by the policy engine to the identified value.

47. The appliance of claim 28, wherein the means for assigning comprises a means for assigning, by a policy engine, one of a plurality of types of access responsive to application of a policy to the identified value.

48. The appliance of claim 28, wherein the means for assigning further comprises a means for authenticating the user to a first authentication service responsive to the identified value and to a password provided by the user of the client.

49. The appliance of claim 48, wherein the first authentication service comprises an external authentication server.

50. The appliance of claim 48, wherein the first authentication service comprises an authentication database of the appliance.

51. The appliance of claim 28, wherein the means for assigning further comprises a means for authenticating a user of the client to a second authentication service, responsive to a first user name and a password if identification of the first value fails.

52. The appliance of claim 28, wherein the means for assigning further comprises a means for assigning one of a plurality of types of access, each of the plurality of access types associated with at least one connection characteristic, the connection characteristic identifying an accelerated connection.

53. The appliance of claim 28, wherein the means for assigning further comprises a means for assigning one of a plurality of types of access, each of the plurality of access types associated with at least one connection characteristic, the connection characteristic identifying a load-balanced connection.

54. The appliance of claim 28, wherein the means for assigning further comprises a means for assigning one of a plurality of types of access, each of the plurality of access types associated with at least one connection characteristic, the connection characteristic identifying a traffic-managed connection.

55. The appliance of claim 28, wherein the means for assigning further comprises a means for assigning one of a plurality of types of access, each of the plurality of access types associated with at least one connection characteristic, the connection characteristic identifying a session-managed connection.

* * * * *

UNITED STATES PATENT AND TRADEMARK OFFICE
CERTIFICATE OF CORRECTION

| | | |
|---|---|---|
| PATENT NO. | : 8,413,229 B2 | Page 1 of 1 |
| APPLICATION NO. | : 11/465894 | |
| DATED | : April 2, 2013 | |
| INVENTOR(S) | : Mullick et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this
Twenty-fifth Day of November, 2014

Michelle K. Lee
*Deputy Director of the United States Patent and Trademark Office*